(12) United States Patent
Meiers et al.

(10) Patent No.: US 6,821,000 B2
(45) Date of Patent: Nov. 23, 2004

(54) LIGHT INTEGRATOR USING AN END-SUPPORTED GLASS ROD FOR ENHANCED UNIFORMITY AND ROBUST SUPPORT

(75) Inventors: Ronald E. Meiers, Holley, NY (US); William H. Russel, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 254 days.

(21) Appl. No.: 10/242,231

(22) Filed: Sep. 12, 2002

(65) Prior Publication Data
US 2004/0052088 A1 Mar. 18, 2004

(51) Int. Cl.⁷ ................................................ F21V 7/00
(52) U.S. Cl. ..................... 362/303; 362/217; 362/298; 362/301; 362/343
(58) Field of Search .............................. 362/303, 217, 362/298, 343, 347, 301; 358/474; 385/128

(56) References Cited

U.S. PATENT DOCUMENTS

| | | | |
|---|---|---|---|
| 4,868,383 A | 9/1989 | Kurtz et al. | 250/228 |
| 5,012,346 A | 4/1991 | DeJager et al. | 358/214 |
| 5,103,385 A | 4/1992 | Federico et al. | 362/298 |
| 5,215,370 A | 6/1993 | Kaplan | 362/296 |
| 5,257,340 A * | 10/1993 | Kaplan | 385/128 |
| 5,274,228 A | 12/1993 | Kaplan | 250/227.31 |
| 5,335,158 A | 8/1994 | Kaplan et al. | 362/303 |
| 5,442,533 A * | 8/1995 | Kaplan | 362/303 |

* cited by examiner

Primary Examiner—Stephen Husar
Assistant Examiner—James W Cranson
(74) Attorney, Agent, or Firm—Stephen H. Shaw

(57) ABSTRACT

A light integrator comprising: an elongated cylindrical light integrating cavity having a longitudinal cylindrical chamber wall with a diffusely reflecting interior surface, said chamber wall having a longitudinally extending output slit for emitting light from the cavity; an elongated glass rod extending into the cavity, said glass rod having an input port at one end thereof for introducing the beam of light and a treatment along its length for emitting light entering its port into the cavity; and an end wall including a supporting feature for supporting an end of the elongated glass rod opposite its input port so that the glass rod extends along a length of the integrating cavity in relation to the chamber wall thereof to direct light emitted therefrom toward the diffusely reflecting interior surface, whereby the supporting feature comprises a bore that is recessed into the end wall with a linear dimension leaving an enclosed open space between the end of the glass rod and the end wall of the cavity for diffusely reflecting light reaching the end of the rod back into the rod for another opportunity to exit the rod through the treatment.

8 Claims, 3 Drawing Sheets

LIGHT INTEGRATOR USING AN END-SUPPORTED GLASS ROD FOR ENHANCED UNIFORMITY AND ROBUST SUPPORT

FIELD OF THE INVENTION

The invention relates to a linear light source, and more particularly to such a linear light source for use in a film scanner.

BACKGROUND OF THE INVENTION

Light integrating chambers for film scanning are known in the prior art. A conventional cylindrical integrating cavity used in a film scanner is shown in FIG. 1. As currently used as linear light sources in many film scanners, light from a lamp 12 and a lens 14 is directed into a hole 16 in a cylinder wall of an integrating cylinder 10. The light reflects many times against the white interior chamber wall of the cylinder 10 to randomize its distribution. This randomization is intended to produce uniform, diffuse light within the cylinder 10, which then exits through a long, narrow exit slit 18 to produce a stripe of uniform, diffuse illumination applied against a surface of an original material, such as a film 20. The light passing through the film 20 is modulated in intensity by the density varying image on the film and focused by a lens system 21 on a sensor array 24.

It is desirable to produce a highly intense, uniform and lambertian line source of illumination for use in a film scanner application. A further requirement for an illumination system is that the efficiency be as high as possible while still providing the desired uniformity and diffusion. This can be achieved by designing the cavity to have the highest possible reflectivity of the walls and the minimum possible area for the introduction of the light. Bulk diffusers such as Spectralon currently have the lowest loss of available reflective diffuse materials. Furthermore, an integrating cylinder apparatus that allows a small interior surface area and entrance hole area while maintaining a desired intensity profile by using a light pipe to couple light into the cavity has been disclosed in U.S. Pat. No. 5,274,228 (M. Kaplan). As shown in FIG. 2, this type of illuminator allows light into a cylindrical cavity 34 via a glass rod 22 which is positioned along the longitudinal direction of the cylindrical cavity 34. Light 28 enters the rod 22 at one end 26 and then propagates inside the rod via total internal reflection (TIR) towards the opposite end 29 of the rod. The rod is given a surface treatment 30 that disrupts the TIR and diffusely leaks light 32 into the cavity interior where it is diffused further and eventually finds its way out the exit slit 18. The amount of light released into the cavity interior at any particular spot then is roughly proportional to the degree or width of the surface treatment 30 but is also influenced by the characteristics of the input light angular component.

The method of the '228 patent performs well when the input light contains a wide range of input angles as the higher angled light more easily exits the rod at the surface treatment 30 than does shallow angled light. This effect implies that after light has traveled down the length of the rod much of its higher angled light exits the rod leaving a more collimated beam at the end of the rod. Further, it implies that there is still a substantial amount of light at the end of the rod which if allowed to flood the end of the cavity would produce a bright spot at the end of the cavity. It is desirable then to diffusely reflect this lower angled light using a reflecting mirror 36 at the end of the rod back into the rod for another chance of exiting the rod in more useful locations along the rod. (Alternatively, the mirror 36 may be replaced by a white, diffusely reflecting surface spaced at least a few wavelengths of light away from the end of the rod.) The act of diffusing the light at the end of the rod redistributes the angular components so as to produce more higher angled light which has a better chance at exiting the rod at locations along its surface treatment.

Furthermore, it is desirable to be able to attenuate the intensity of the output light from the illuminator without undue adverse effects on the spatial profile exiting the illuminator slit. The range of desired attenuation is typically somewhere around five to six F-stops. This is accomplished by attenuating the light before it enters the cavity via its glass rod component. According to this method of attenuation, a pair of movable V-shaped blades 34 (see FIG. 2) are placed in the light path so as to provide a means of varying the amount of light passing through the aperture. In so doing, the collection of input light path angles becomes truncated as the aperture is closed down. This causes a change in the source light angular component entering the integrator cavity. Changing the aperture opening varies the amount of light likely to reach the end of the rod and thus also effects the spatial profile as a function of the aperture opening. This is an undesirable effect. In most scanners that use the known types of illuminators, however, the problem is unaddressed because they do not require attenuation of the light source.

As mentioned above, the concept of diffusely reflecting light back into the rod is generally disclosed in the '228 patent; however, the disclosed concept involves drawbacks that are neither identified nor described. For example, by not holding/capturing the end of the rod or by allowing a space between the end of the rod and the far end of the cavity interior, a bright spot is generated at the far end of the cavity due to excessive flooding with light. Conversely, attempting to capture the end of the rod in a bore slightly bigger than the rod provides no support for the rod and still allows some flooding to occur. Attempting to capture the end of the rod inside a bore of the same size as the rod where the rod snugly fits into the bore fails when the tolerance of the diameter of the rod exceeds the diameter of the bore; a slightly oversized rod will not fit into the bore. Furthermore, when a high power light source is used, a considerable amount of energy reaches the end of the rod and may damage the diffusely reflective material/coating at the surface of the cavity if insufficient cooling is provided such as forced air injected into the cavity. If the end of the rod is captured in a snug fitting bore there is little chance of circulating cooling air to get around the end of the rod.

Currently, illuminators that use glass rods in cavities use various techniques to hold the rod inside the cavity. A) As shown in FIG. 2, some designs use no interior end holding feature; the rod is held at the input end only. This means that the (cavity interior) end of the rod is free to wiggle or bottom out via gravity to the bottom of the cavity. This method has been used where the cavity is only slightly larger (in diameter) than the rod and when the design does not need to operate over a wide range of attenuation. Often, no special attention is given to recoupling the light at the end of the rod other than its close proximity to the end wall (of diffusely reflective material). B) At least one other design uses a "V" shaped end feature to help center the rod at the end of the cavity and provide a minimal contact to the rod material. Again, this design does not require a wide range of attenuation, as does the design mentioned above. Also, when using a "V" shaped feature, there is no guarantee that the rod, due to length tolerances, will in fact engage the "V"

shaped edges. Usually the input end of the rod is constrained to a particular dimension/position and the far end of the rod (inside the cavity) is allowed to vary in position due to the rod length tolerances. C) Some designs have attempted to use a bore in the end face wall of the cavity to allow the rod to fit inside the bore. The problem with this design is that if the bore is selected to have a diameter the same as the rod diameter then some rods will not fit into the bore if they are slightly over-sized. Conversely, if the rod diameter is less than the diameter of the bore, then the rod is in effect not held or constrained.

SUMMARY OF THE INVENTION

The present invention is directed to overcoming one or more of the problems set forth above. Briefly summarized, according to one aspect of the present invention, the invention resides in a light integrator comprising: an elongated cylindrical light integrating cavity having a longitudinal cylindrical chamber wall with a diffusely reflecting interior surface, said chamber wall having a longitudinally extending output slit for emitting light from the cavity; an elongated glass rod extending into the cavity, said glass rod having an input port at one end thereof for introducing the beam of light and a treatment along its length for emitting light entering its port into the cavity; and an end wall including a supporting feature for supporting an end of the elongated glass rod opposite its input port so that the glass rod extends along a length of the integrating cavity in relation to the chamber wall thereof to direct light emitted therefrom toward the diffusely reflecting interior surface, whereby the supporting feature comprises a bore that is recessed into the end wall with a linear dimension leaving an enclosed open space between the end of the glass rod and the end wall of the cavity for diffusely reflecting light reaching the end of the rod back into the rod for another opportunity to exit the rod through the treatment.

In an alternative aspect of the invention, the supporting feature comprises a bore that is recessed into the end wall and includes a flexible wall structure extending outward from the end cap and providing a semi-rigid support for the end of the rod. In yet another alternative aspect of the invention, the supporting feature comprises a multi-sided bore that is recessed into the end wall and provides open spaces at corners thereof when the end of the glass rod is received into the bore.

The advantage of the invention is that it provides robust means for holding the end of a rod inside the cavity, while at the same time improving the dynamic shading performance while allowing various diameter tolerance rods to fit the holder structure.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because linear light sources and light integrators are well known, the present description will be directed in particular to elements forming part of, or cooperating more directly with, apparatus in accordance with the present invention. Elements not specifically shown or described herein may be selected from those known in the art.

Figure 3:
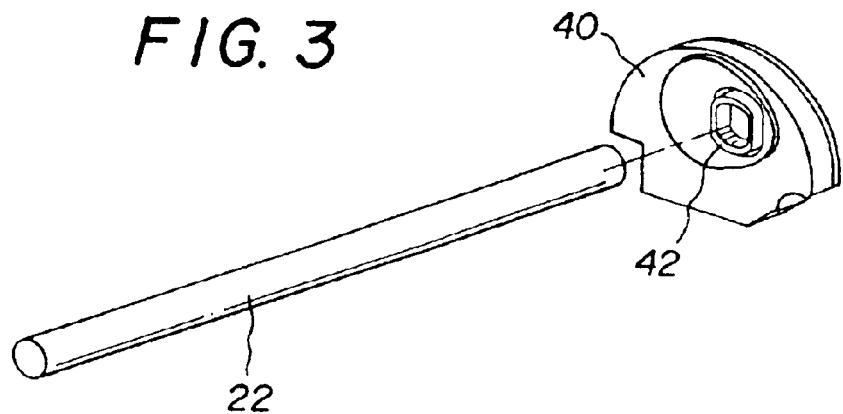
FIG. 3 is a perspective view showing the main components of the invention including the glass rod and the end cap that the rod fits into.
Figure 4:
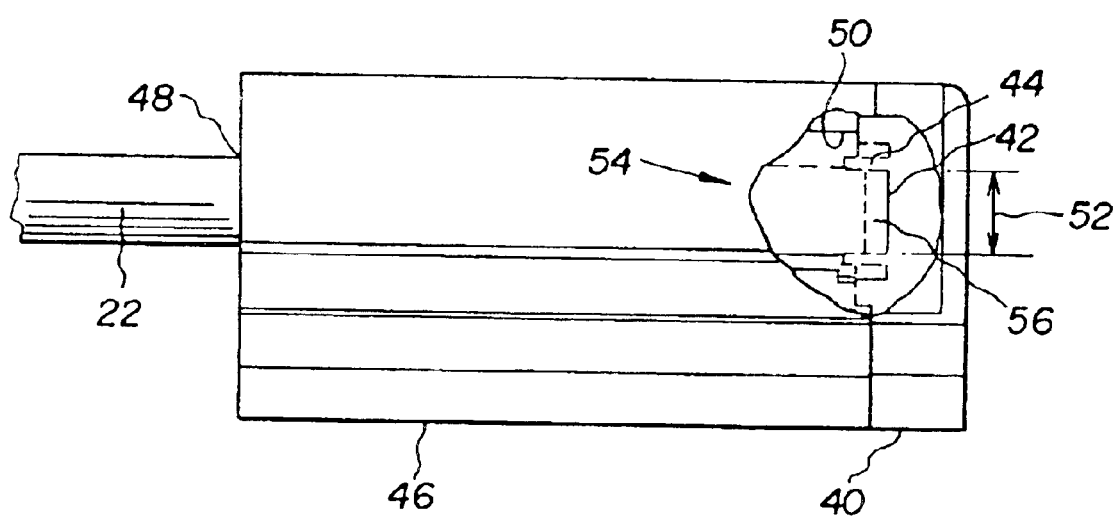
FIG. 4 shows a side view of a cavity showing the rod engaged into the end cap via a cut-away view.

FIG. 3 is a perspective view showing the main components of the invention, including the elongated glass rod 22 and an end cap 40 including a supporting feature 42 that the rod 22 fits into. The glass rod 22 is preferably manufactured from quartz or fused silica. As shown in FIG. 4, the end cap 40 is attached to an integrating cavity body 46. More specifically, the end cap 40, together with its supporting feature 42, and the integrating cavity body 46 are made of a Spectralon material (a white diffusely reflective material with high reflectivity made by Labsphere, Inc., North Sutton, N.H. 03260). The supporting feature 42 includes a machined diamond shaped wall structure 44 of about 3 mm in height and with a thickness of about 0.5 mm and designed to accept/capture the glass rod 22. In the preferred embodiment, the wall structure has a degree of flexibility that allows various diameter tolerance rods to fit into the supporting feature 42. In addition, as shown in the cut-away view 54, the supporting feature 42, and the wall structure 44 therewith, is partially recessed into the end-cap 40. The end-cap itself is about 5 mm in thickness.

Figure 1:
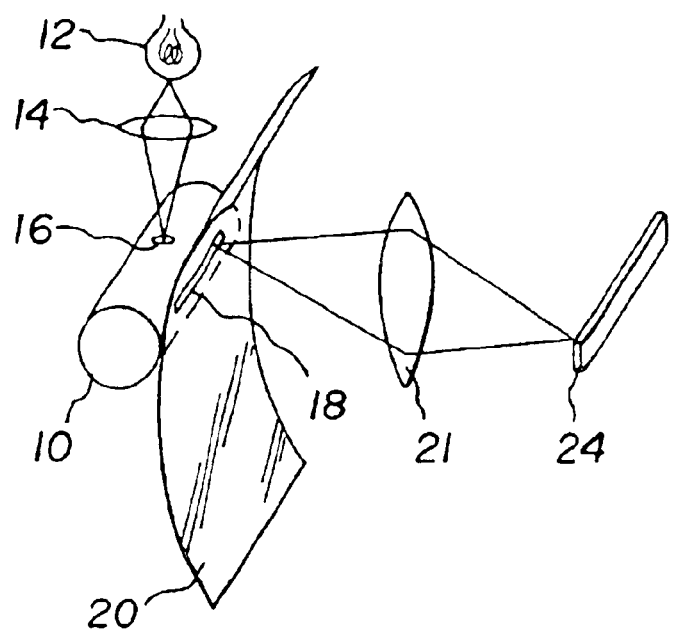
FIG. 1 is a perspective view of a prior art film scanner and linear light source.
Figure 2:
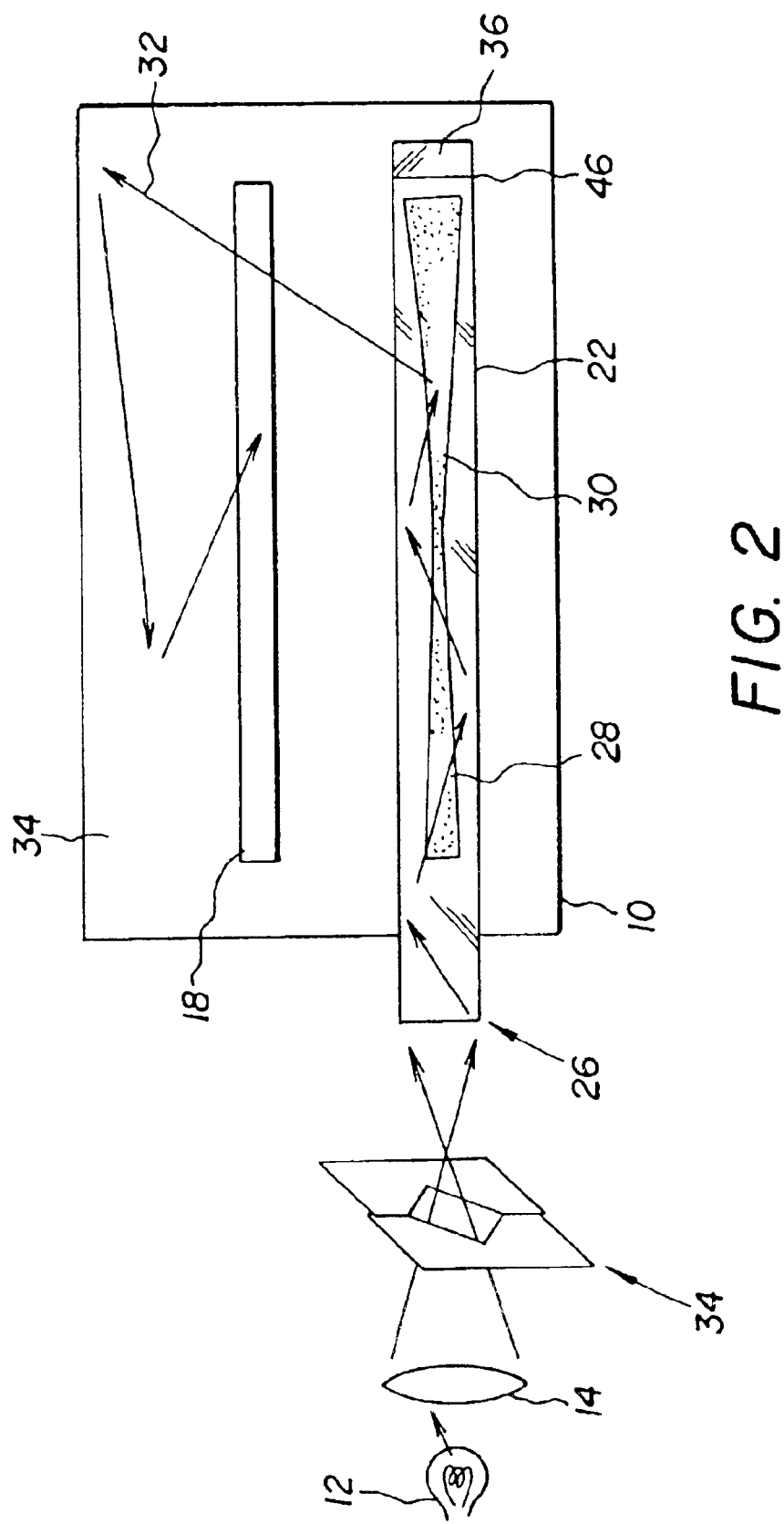
FIG. 2 is a schematic elevation view of a prior art film scanner illustrating the arrangement of a source lamp, glass rod light pipe and integrating cylinder outlet slit.

Thus, the integrating cavity assembly generally comprises two pieces: The first piece is the cavity body 46 which comprises a round input port 48 at one end of the cavity where the glass rod 22 enters the cavity, a generally cylindrical cavity interior with diffusely reflective interior chamber walls 50, and a rectangular exit slit (not shown in FIG. 4, but same as the slit 18 shown in FIGS. 1 and 2) positioned longitudinally along the cavity where light is allowed to exit the cavity. The length of the cavity body is designed to match the width of the film being scanned. The second piece is the end cap 40, which closes the cavity. A two-piece design was chosen for ease of manufacturing and to allow access to the cavity interior for cleaning and access for the machining tools/processes.

The shape of the supporting feature 42 defines a bore having an interior width 52 determined by the minimum expected diameter of the glass rod 22; this insures that the rods will engage the feature. The maximum allowable inner width 52 of the bore is determined by the flexibility of the material as set by its composition and thickness plus any additional flexibility derived from slitting the corners of the feature plus the maximum expected diameter of the rod. Another determining factor for the thickness of the capturing/holding feature 42 is that it must be thick enough to diffusely reflect light. One purpose of the feature 42 is to diffusely reflect light at the end of the rod back into the rod for another chance at exiting the rod via its surface treatment at more useful locations along the rod/surface treatment. The treatment could be, for example, a white paint or a grind or etching of the rod surface. In addition, it has been found that capturing the end of the rod and thus reducing the flooding of light at the far end of the cavity also improves the dynamic shading characteristics. This improvement is primarily due to disallowing flooding at the far end of the cavity.

In the known systems that allow an unsupported space between the end of the rod and the far end of the cavity interior, a bright spot is generated at the far end of the cavity due to excessive flooding with light. This is ordinarily a problem. However, the preferred embodiment turns what would be a problem into a benefit. By utilizing the wall structure 44, the supporting feature 42 allows a small enclosed space 56 between the end of the rod 22 and the end face of the cap 40. This space allows for a varying length tolerance of the rod and, being enclosed by light reflecting surfaces, allows the light at the end of the rod to diffuse slightly before reaching the flat end face of the cap, thus reducing the energy per unit area hitting the Spectralon material.

Figure 5:
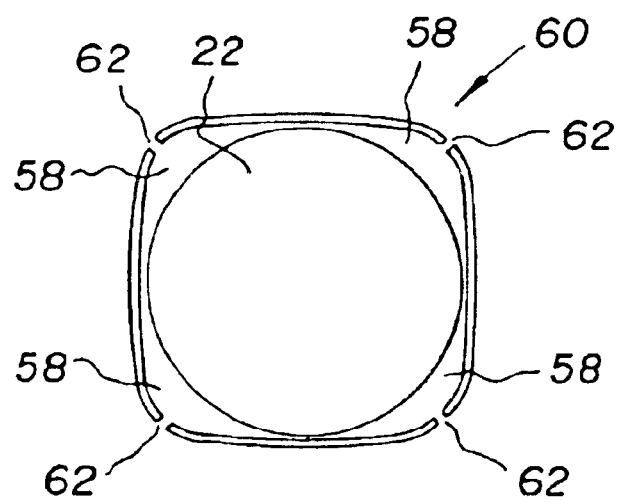
FIG. 5 is a end elevation of the glass rod as captured by the multi-walled support feature in the end cap, showing the open spaces at the corners thereof.

As shown in FIG. 5, the diamond shape is chosen over a round shape so as to allow some air to enter and exit the rear of the rod via the rod holding feature. When sliding a round rod into an essentially square hole, there will be four roughly triangular spaces 58 at the diamond corners that extend into the space behind the rod. This provides a convenient means to ventilate the otherwise captured air pocket behind the rod. In the preferred embodiment, the diamond shape has slightly rounded corners 60 that may additionally be slitted (slits 62) to allow extra flexing of its thin walls. It would be obvious to one of ordinary skill that other multi-walled structures could be chosen with the same or substantially similar effect, for example, a hexagonal structure.

In summary, this invention solves the problem of diffusely reflecting light at the end of the rod back into the rod by adding a rod holding/capturing feature 42 at the far end of the cavity 46 made of the same diffusely reflective material as that of the cavity (such as Spectralon). This configuration accomplishes three things:

1) The feature 42 holds the end of the rod 22 and provides a semi-rigid support for the end of the rod and thus improves the robustness of the optical component—the glass rod 42. This becomes especially important when the length of the rod becomes long.
2) The feature 42 captures the end of the rod 22 and prevents flooding the end of the cavity with excessive light at that spot. This helps to improve the dynamic shading characteristics by closely coupling the newly diffused light back into the rod. The feature also deals with a varying amount of collimated light at the end of the rod caused by removing/truncating higher angled light at the aperture mechanism.
3) The shape of the feature 42 is such that glass rods with various dimensional tolerances can still fit into the feature due to its relatively thin walled construction as well as its slitted corner features that allow the feature to expand slightly when a rod is inserted. This aspect of the feature additionally provides at least some cooling air to reach the end of the rod.

Consequently, by adding a machined Spectralon structure at the far end of the cavity (with a thickness of about 0.5 mm and a height of about 2 mm and in the shape of a diamond), the problem of holding the end of a rod inside the cavity was addressed, while at the same time improving the dynamic shading performance while allowing various diameter tolerance rods to fit the holder structure. The diamond shape has slightly rounded corners that may additionally be slitted to allow extra flexing of its thin walls. It is this flexing that solves the problem of inserting rods of varying diameter tolerance. In addition to expanding radially, the structure also allows a small space between the end of the rod and the end face of the cap. This space allows for a varying length tolerance of the rod and allows the light at the end of the rod to diffuse slightly before reaching the flat end face of the cap and thus reduces the energy per unit area hitting the Spectralon material.

The invention has been described in detail with particular reference to certain preferred embodiments thereof, but it will be understood that variations and modifications can be effected within the spirit and scope of the invention.

PARTS LIST

10 integrating cylinder
12 lamp
14 lens
16 hole
18 exit slit
20 film
21 lens system
22 glass light pipe rod
24 sensor array
26 input end
28 input light
29 opposite end
30 surface treatment
34 V-shaped blades
36 reflecting mirror
40 end cap
42 feature
44 wall structure
46 cavity body
48 input port
50 chamber walls
52 interior width
54 cut away space
56 open space
58 open corner spaces
60 corners
62 slits

What is claimed is:

1. A light integrator for producing diffuse illumination from a beam of light for illuminating an original, said light integrator comprising:
    an elongated cylindrical light integrating cavity having a longitudinal cylindrical chamber wall with a diffusely reflecting interior surface, said chamber wall having a longitudinally extending output slit for emitting light from the cavity;
    an elongated glass rod extending into the cavity, said glass rod having an input port at one end thereof for introducing the beam of light and a treatment along its length for emitting light entering its port into the cavity; and
    an end wall including a supporting feature for supporting an end of the elongated glass rod opposite its input port so that the glass rod extends along a length of the integrating cavity in relation to the chamber wall thereof to direct light emitted therefrom toward the diffusely reflecting interior surface, whereby the supporting feature comprises a bore that is recessed into the end wall with a linear dimension leaving an enclosed open space between the end of the glass rod and the end wall of the cavity for diffusely reflecting light reaching the end of the rod back into the rod for another opportunity to exit the rod through the treatment.

2. A light integrator for producing diffuse illumination from a beam of light for illuminating an original, said light integrator comprising:

an elongated cylindrical light integrating cavity having a longitudinal cylindrical chamber wall with a diffusely reflecting interior surface, said chamber wall having a longitudinally extending output slit for emitting light from the cavity;

an elongated glass rod extending into the cavity, said glass rod having an input port at one end thereof for introducing the beam of light and a treatment along its length for emitting light entering its port into the cavity; and an end wall including a supporting feature for supporting an end of the elongated glass rod opposite its input port so that the glass rod extends along a length of the integrating cavity in relation to the chamber wall thereof to direct light emitted therefrom toward the diffusely reflecting interior surface, whereby the supporting feature comprises a flexible wall structure extending outward from the end cap and providing a semi-rigid support for the end of the rod.

3. The light integrator as claimed in claim 2 wherein the wall structure forms a multi-sided bore that is recessed into the end wall and provides open spaces at corners thereof when the end of the glass rod is received into the bore.

4. The light integrator as claimed in claim 3 wherein the wall structure is slitted to allow extra flexing of the wall structure.

5. A light integrator for producing diffuse illumination from a beam of light for illuminating an original, said light integrator comprising:

an elongated cylindrical light integrating cavity having a longitudinal cylindrical chamber wall with a diffusely reflecting interior surface, said chamber wall having a longitudinally extending output slit for emitting light from the cavity;

an elongated glass rod extending into the cavity, said glass rod having an input port at one end thereof for introducing the beam of light and a treatment along its length for emitting light entering its port into the cavity; and an end wall including a supporting feature for supporting an end of the elongated glass rod opposite its input port so that the glass rod extends along a length of the integrating cavity in relation to the chamber wall thereof to direct light emitted therefrom toward the diffusely reflecting interior surface, whereby the supporting feature comprises a multi-sided bore that is recessed into the end wall and provides open spaces at corners thereof when the end of the glass rod is received into the bore.

6. The light integrator as claimed in claim 5 wherein the multi-sided bore has a sufficient longitudinal dimension that the glass rod is captured within the cavity leaving an open space between the end of the rod and the end wall of the cavity.

7. The light integrator as claimed in claim 6 wherein the multi-sided bore has a flexible diamond wall structure extending outward from the end wall such that when the rod is fitted into the cavity there are four generally triangular spaces at corners of the diamond wall structure that extend into the open space behind the rod.

8. The light integrator as claimed in claim 7 wherein the wall structure is slitted at the corners to allow extra flexing of the wall structure.

* * * * *